United States Patent
Blevins et al.

(10) Patent No.: US 10,919,553 B2
(45) Date of Patent: Feb. 16, 2021

(54) TOILET LIFT APPARATUS

(71) Applicants: Elva Blevins, Gresham, OR (US);
Irmgard Blevins, Gresham, OR (US)

(72) Inventors: Elva Blevins, Gresham, OR (US);
Irmgard Blevins, Gresham, OR (US)

( * ) Notice: Subject to any disclaimer, the term of this patent is extended or adjusted under 35 U.S.C. 154(b) by 174 days.

(21) Appl. No.: 16/168,936

(22) Filed: Oct. 24, 2018

(65) Prior Publication Data
US 2020/0130721 A1    Apr. 30, 2020

(51) Int. Cl.
*B62B 3/06* (2006.01)
*B66F 3/36* (2006.01)
*B66F 9/18* (2006.01)

(52) U.S. Cl.
CPC .......... *B62B 3/0625* (2013.01); *B62B 3/0606* (2013.01); *B66F 3/36* (2013.01); *B66F 9/18* (2013.01); *B62B 2202/80* (2013.01); *B62B 2203/10* (2013.01)

(58) Field of Classification Search
CPC ..... B62B 3/104; B62B 3/0606; B62B 3/0625; B62B 3/0618; B62B 2202/80
USPC ....... 254/8 B, 8 R, 15, 16, 17, 50, 129, 130, 254/131
See application file for complete search history.

(56) References Cited

U.S. PATENT DOCUMENTS

| | | | | |
|---|---|---|---|---|
| 764,344 A * | 7/1904 | Buckelew | ............. | B62B 5/0083 414/458 |
| 1,322,299 A * | 11/1919 | Fouts | ........................ | B66F 5/04 254/8 R |
| 2,121,764 A * | 6/1938 | Quayle | ................. | B62B 3/0625 254/100 |
| 2,625,368 A * | 1/1953 | Warner | ................... | E04F 21/22 254/15 |
| 4,722,511 A * | 2/1988 | Chitwood | ............. | B62B 3/0625 254/7 R |
| 4,902,191 A * | 2/1990 | Cumbest | ................. | B66C 23/48 254/10 R |
| 5,441,378 A * | 8/1995 | Puls | ........................ | B60P 3/062 254/8 R |
| 5,618,152 A * | 4/1997 | Andrews | ................. | B62B 3/104 414/546 |
| 5,810,548 A * | 9/1998 | Stenudd | .................... | A61G 7/08 414/680 |
| 6,135,466 A | 10/2000 | Irwin | | |
| D468,512 S | 1/2003 | Hernandez | | |

(Continued)

FOREIGN PATENT DOCUMENTS

WO    WO2013059304    4/2013

*Primary Examiner* — Joseph J Hail
*Assistant Examiner* — J Stephen Taylor

(57) ABSTRACT

A toilet lift apparatus for removing and installing toilets includes a base having a left side slidably engageable with a right side. An attachment bar is coupled to the base. A pair of supports is coupled to the base and a cantilever is coupled to the pair of supports. The cantilever selectively engages with a toilet and pivots on the pair of supports to lift and alternatively lower the toilet. A ratchet assembly is coupled to the cantilever to pull in, or alternatively push out, each of the left arm and the right arm. A latch bar is coupled to the ratchet assembly and extends down past the attachment bar. The latch bar has a plurality of hooks with each of the plurality of hooks being selectively engageable with the attachment bar.

10 Claims, 5 Drawing Sheets

(56) References Cited

U.S. PATENT DOCUMENTS

| | | | |
|---|---|---|---|
| 6,752,379 B1* | 6/2004 | Wall | B62B 5/0083 |
| | | | 254/134 |
| 7,798,469 B2 | 9/2010 | Junca | |
| 7,823,862 B2 | 11/2010 | Wakil | |
| 8,950,732 B2 | 2/2015 | Jordan | |
| 9,302,892 B1* | 4/2016 | Summit | B66F 9/18 |
| 2006/0185342 A1* | 8/2006 | Hruska | A01D 78/146 |
| | | | 56/378 |
| 2007/0256238 A1* | 11/2007 | Wakil | B62B 3/0643 |
| | | | 4/661 |
| 2014/0339483 A1* | 11/2014 | Herb | B62B 3/10 |
| | | | 254/2 C |
| 2018/0346057 A1* | 12/2018 | Mukai | B60G 17/02 |

\* cited by examiner

TOILET LIFT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to toilet lifts and more particularly pertains to a new toilet lift for removing and installing toilets.

BRIEF SUMMARY OF THE INVENTION

An embodiment of the disclosure meets the needs presented above by generally comprising a base having a left side and a right side with the left side being slidably engageable with the right side. An attachment bar comprises a left attachment bar coupled to the left side of the base and a right attachment bar coupled to the right side of the base. The left attachment bar is slidably engageable with the right attachment bar. A pair of supports comprises a left support coupled to the left side of the base and a right support coupled to the right side of the base. A cantilever comprises a left arm pivotably coupled to the left support and a right arm pivotably coupled to the right support, each having a lift end and a handle end. The lift end is configured to selectively engage with a toilet and the cantilever pivots on the pair of supports to lift and alternatively lower the toilet. The cantilever has a rest position and an alternate lifted position. A ratchet assembly is coupled to the handle end of each of the left arm and the right arm. The ratchet assembly pulls in or alternatively pushes out, each of the left arm and the right arm, thus moving a left half of the toilet lift apparatus comprising the left side of the base, the left attachment bar, the left support, and the left arm of the cantilever and a right half of the toilet lift apparatus comprising the right side of the base, the right attachment bar, the right support, and the right arm of the cantilever from an open position to an alternate closed position. A latch bar is coupled to the ratchet assembly and extends down past the attachment bar. The latch bar has a plurality of hooks with each of the plurality of hooks being selectively engageable with the attachment bar.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
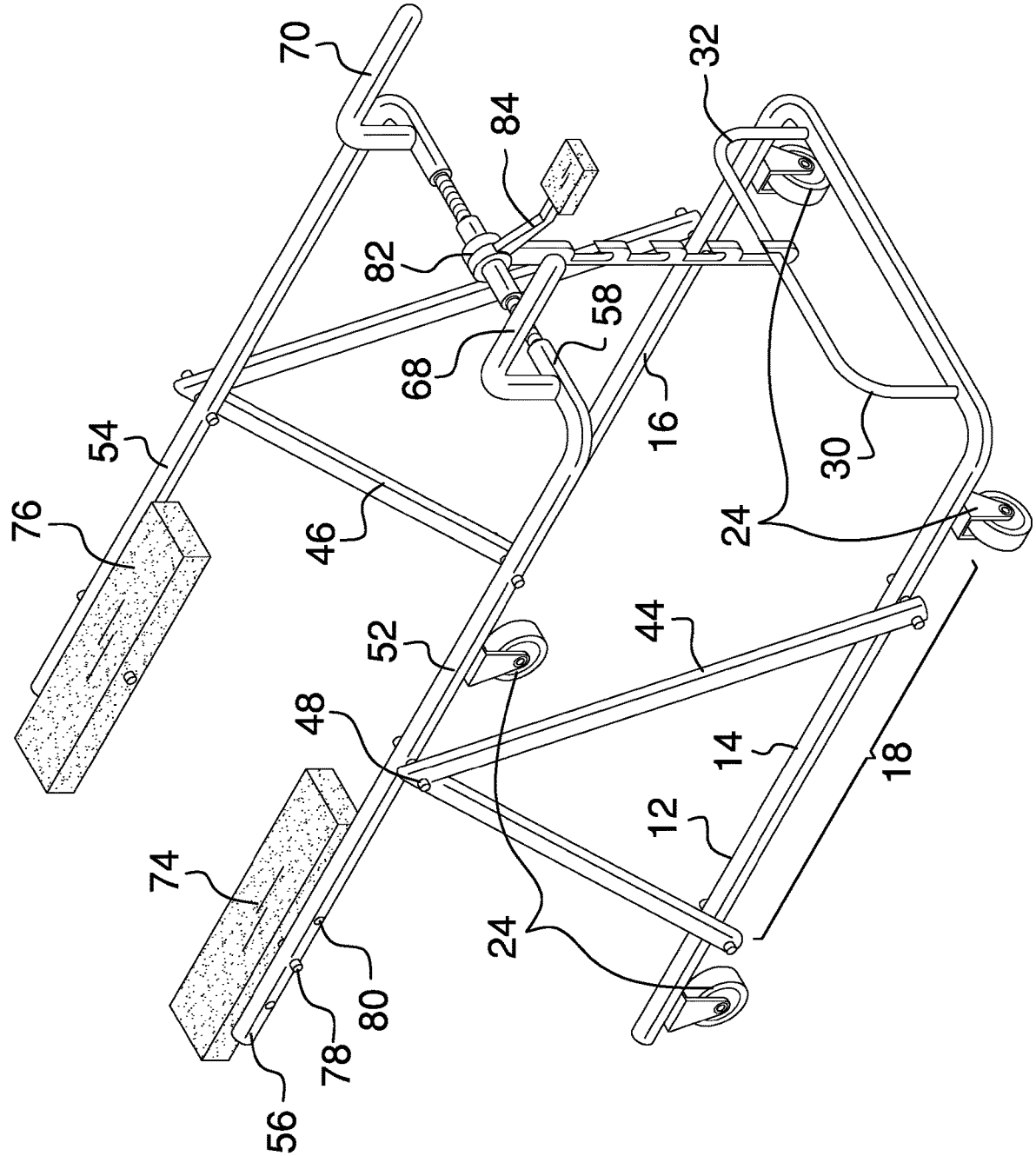
FIG. 1 is an isometric view of a toilet lift apparatus according to an embodiment of the disclosure.
Figure 2:
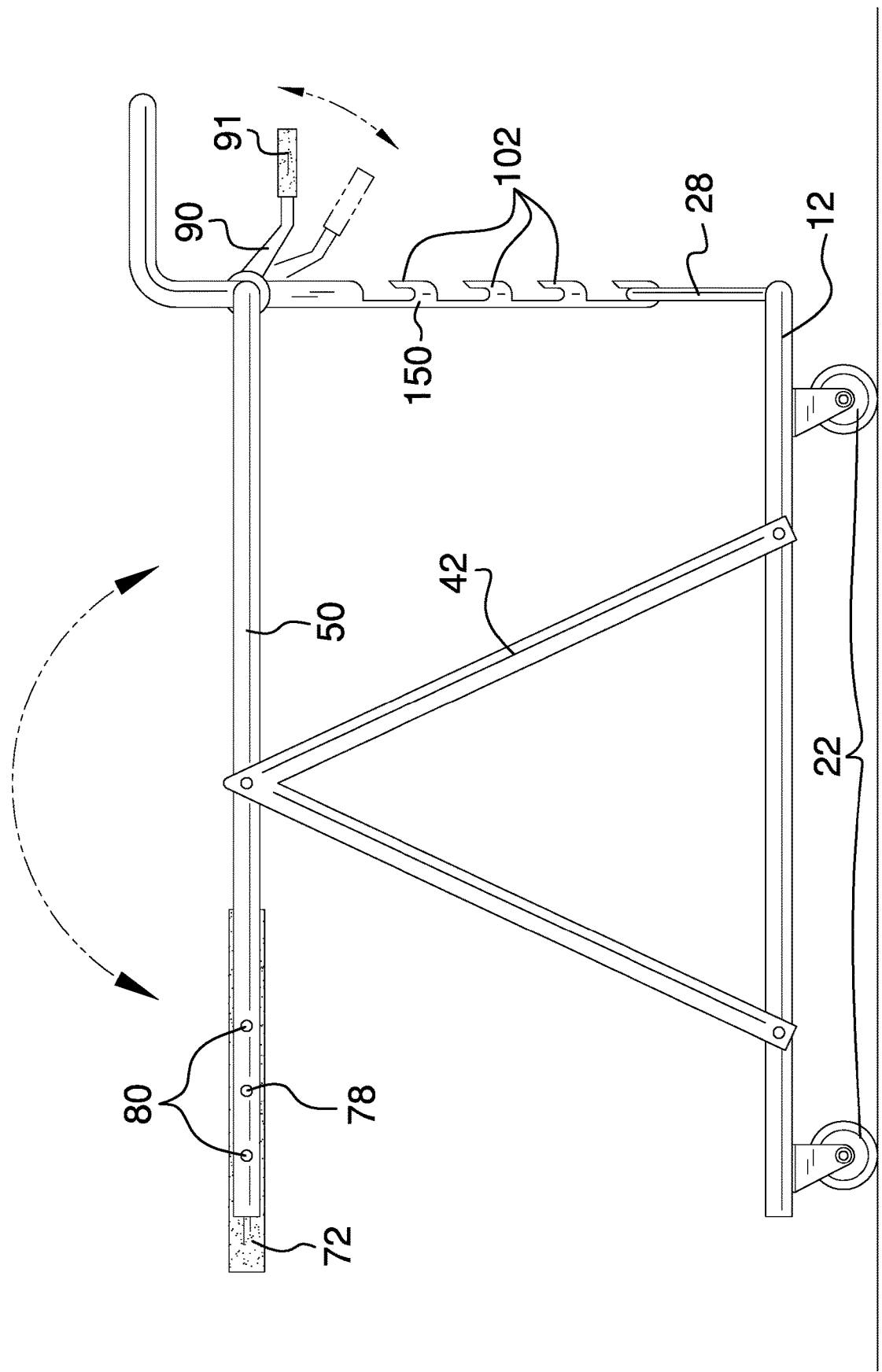
FIG. 2 is a side elevation view of an embodiment of the disclosure.
Figure 3:
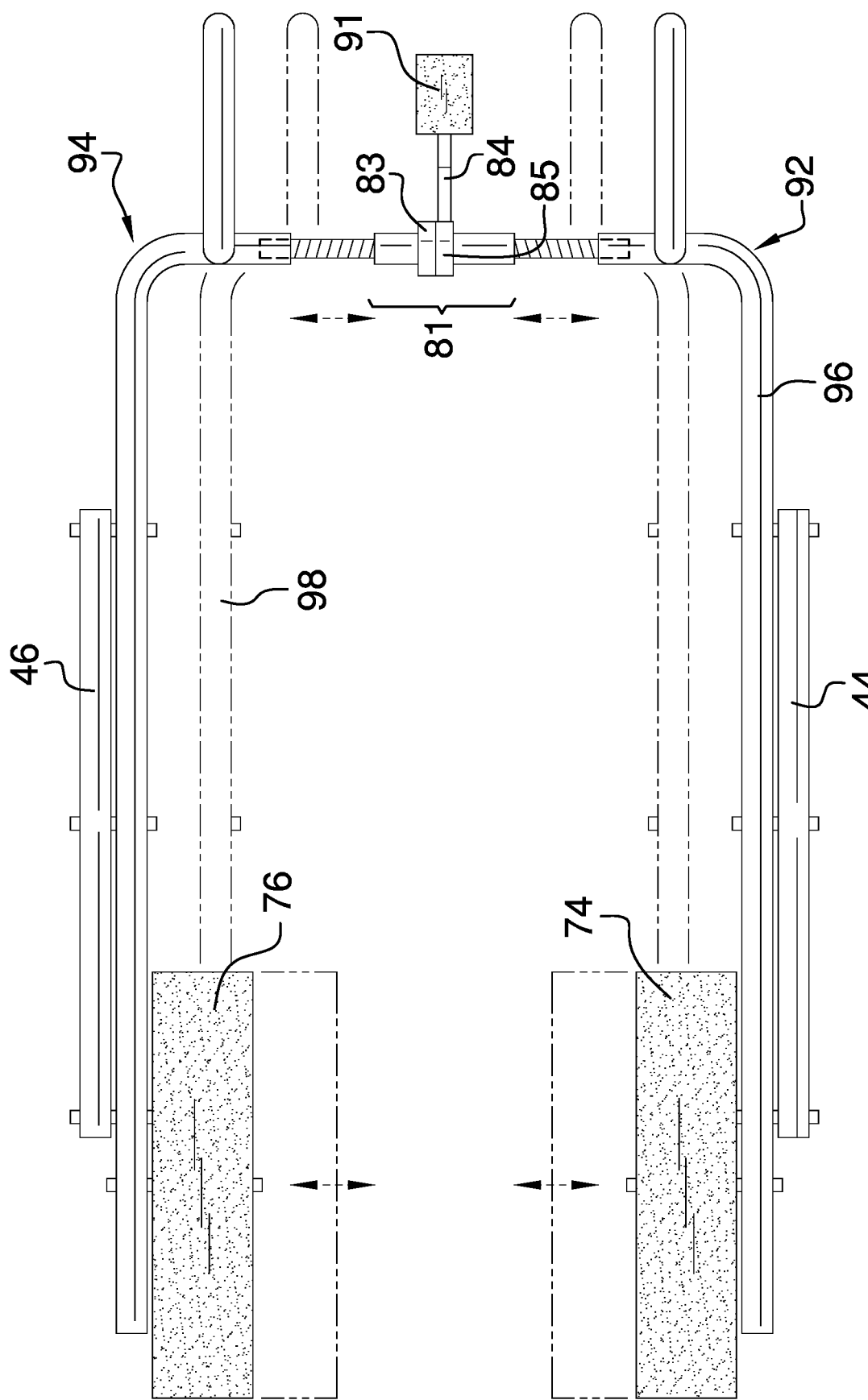
FIG. 3 is a top plan view of an embodiment of the disclosure.
Figure 4:
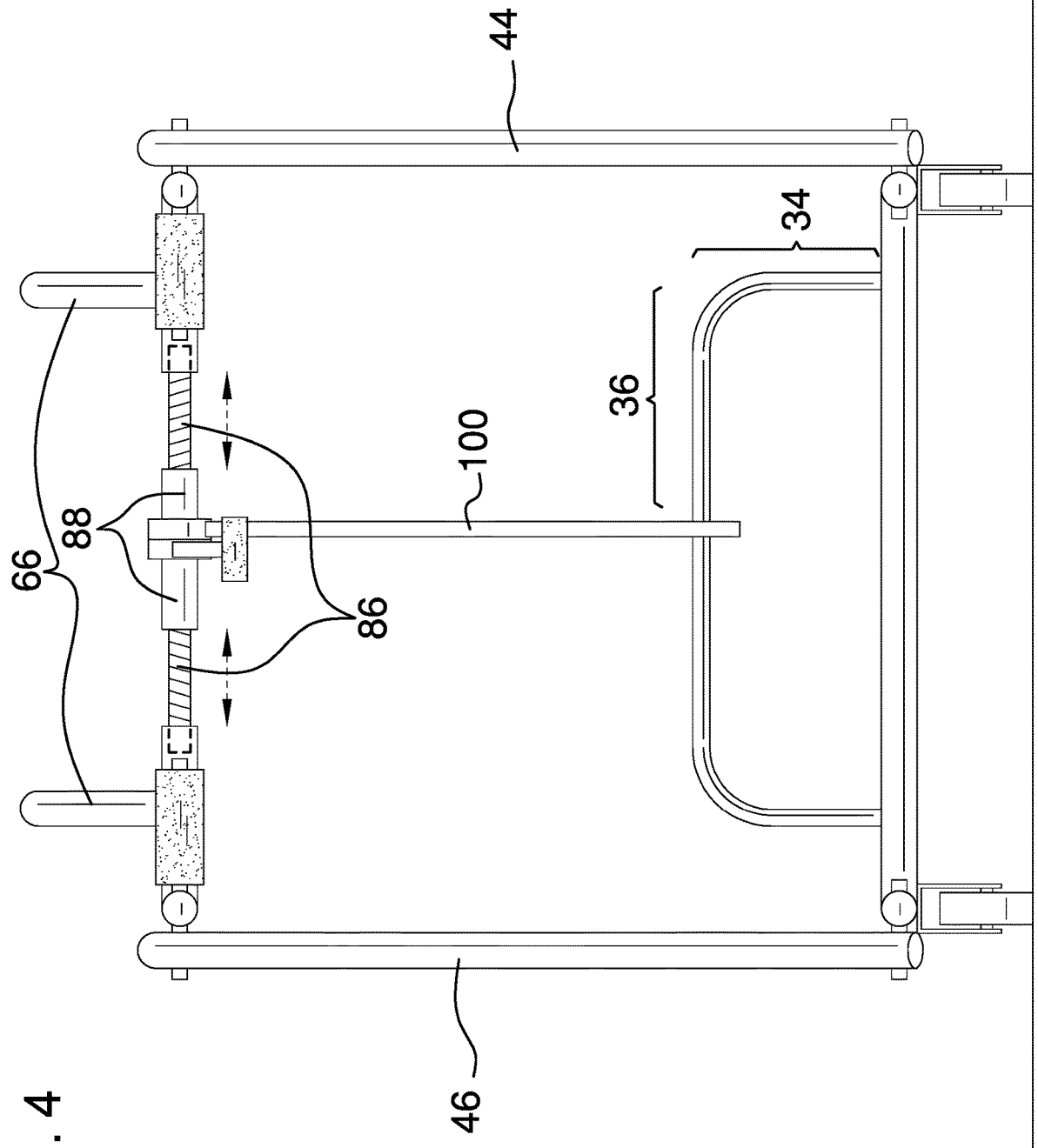
FIG. 4 is a front elevation view of an embodiment of the disclosure.
Figure 5:
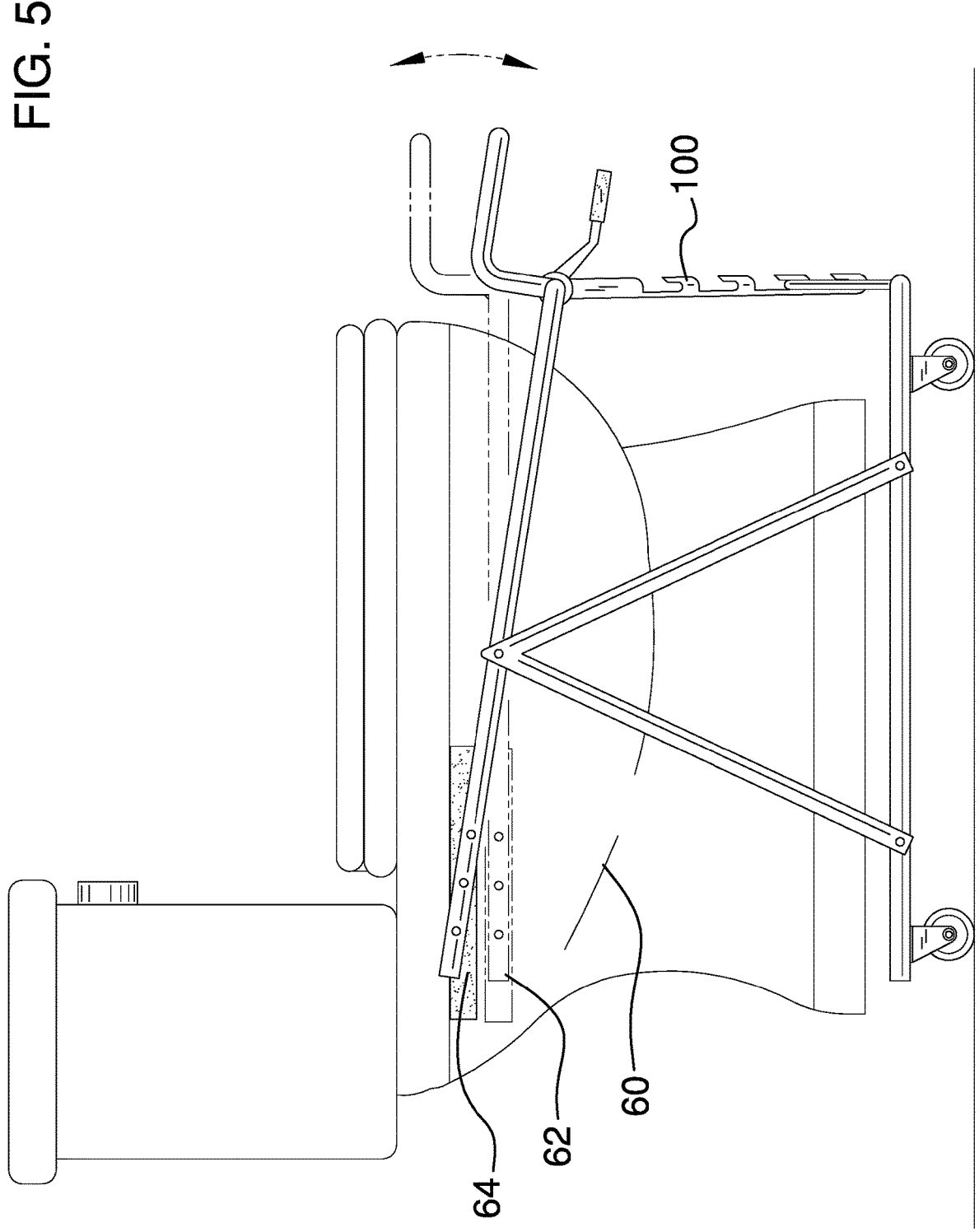
FIG. 5 is an in-use side elevation view of an embodiment of the disclosure.

With reference now to the drawings, and in particular to FIGS. 1 through 5 thereof, a new toilet lift embodying the principles and concepts of an embodiment of the disclosure and generally designated by the reference numeral 10 will be described.

As best illustrated in FIGS. 1 through 5, the toilet lift apparatus 10 generally comprises a base 12 having a left side 14 and a right side 16 with the left side 14 being slidably engageable with the right side 16. The base 12 may be a U-shape with each of the left side 14 and the right side 16 having a forward section 18 perpendicular to a rear section 20. A plurality of wheels 22 may be coupled to the base 12. The plurality of wheels 22 comprises a pair of fixed front wheels 24 and a pair of swivelable rear wheels 26 to enable maneuverability of the base 12.

An attachment bar 28 comprises a left attachment bar 30 and a right attachment bar 32. Each of the left attachment bar 30 and the right attachment bar 32 may have a vertical section 34 and a horizontal section 36. Each of the rear section 20 of the left side 14 and the horizontal section 36 of the left attachment bar 30 may have a thin portion 38 and each of the rear section 20 of the right side 16 and the horizontal section 36 of the right attachment bar 32 may have a hollow portion 40. The thin portion 38 of each of the rear section 20 of the left side 14 and the horizontal section 36 of the left attachment bar 30 is slidably engageable within the hollow portion 40 of each of the rear section 20 of the right side 16 and the horizontal section 36 of the right attachment bar 32, respectively.

A pair of supports 42 comprises a left support 44 coupled to the left side 14 of the base and a right support 46 coupled to the right side 16 of the base. Each of the pair of supports may be an inverted V-shape having a vertex 48. A cantilever 50 is coupled to the pair of supports 42. The cantilever comprises a left arm 52 pivotably coupled to the vertex 48 of the left support 44 and a right arm 54 pivotably coupled to the vertex 48 of the right support 46. Each of the left arm 52 and the right arm 54 has a lift end 56 and a handle end 58. The lift end 56 is configured to selectively engage with a toilet 60. The cantilever 50 pivots on the pair of supports 42 to lift and alternatively lower the toilet 60. The cantilever 50 has a rest position 62 and an alternate lifted position 64. A pair of handles 66 may be coupled to the cantilever. The pair of handles 66 comprises a left handle 68 and a right handle 70 coupled to the handle end 58 of the left arm 52 and the right arm 54, respectively. Each of the pair of handles 66 may be L-shaped and is perpendicularly coupled to the handle end 58 of the left arm 52 and the right arm 54 for increased leverage. A pair of pads 72 may be coupled to the cantilever 50 to protect the toilet 60. The pair of pads 72 comprises a left pad 74 coupled to the lift end 56 of the left arm 52 and a right pad 76 coupled to the lift end 56 of the right arm 54. Each of the pair of pads 72 may be a rectangular prism and may have a pivot 78 that is selectively engageable with a plurality of pivot apertures 80 extending through the lift end 56 of each of the left arm 52 and the right arm 54 of the cantilever. The pivot 78 allows the pair of pads 72 to rotate relative the cantilever 50 to maintain the toilet 60 horizontal when the cantilever 50 is at an angle in the lifted position 64.

A ratchet assembly 81 is coupled to the cantilever 50 and may comprise a ratchet mechanism 82, a lever 84, and a pair of threaded extensions 86. The ratchet mechanism 82 has a fixed half 83, a ratchet half 85, and a pair of sleeves 88. The lever 84 has a lever arm 90 coupled to the ratchet half 86 and a lever pad 91 coupled to the lever arm 90. The lever pad 91 provides a place for a user to operate the ratchet mechanism 82. The pair of threaded extensions 86 is coupled to the ratchet mechanism 82 within the pair of sleeves 88. The pair of threaded extensions 86 rotates as the lever arm 90 is manipulated and is coupled within the handle end 58 of each of the left arm 52 and the right arm 54. The ratchet assembly pulls in, or alternatively pushes out, each of the left arm 52 and the right arm 54 and thus moves a left half 92 of the toilet lift apparatus comprising the left side 14 of the base, the left attachment bar 30, the left support 44, and the left arm 52 of the cantilever and a right half 94 of the toilet lift apparatus comprising the right side 16 of the base, the right attachment bar 32, the right support 46, and the right arm 54 of the cantilever from an open position 96 to an alternate closed position 98. The open position 96 allows the toilet lift apparatus 10 to fit around the toilet 60 and the closed position 98 moves the pair of pads 72 into contact with the toilet 60. A latch bar 100 is coupled to the fixed half 83 of the ratchet assembly and extends down past the attachment bar 28. The latch bar 100 has a plurality of hooks 102 with each of the plurality of hooks being selectively engageable with the attachment bar 28 to secure the cantilever in the lifted position 64.

In use, the toilet lift apparatus 12 is wheeled around the toilet 60 with the cantilever 50 in the rest position 62. The ratchet mechanism 82 is then operated using the lever 84 to draw the left half 92 and the right half 94 together from the open position 96 to the closed position 98 to engage the pair of pads 72 with the toilet. The user then pushes down on the pair of handles 66 to move the cantilever in to the lifted position 64 and lift the toilet 60. One of the plurality of hooks 102 is then engaged with the attachment bar 28 to maintain the toilet 60 lifted as it is wheeled out. To place the toilet 60, the latch bar 100 is unhooked from the attachment bar 28 and the cantilever 50 is returned to its rest position 62. The ratchet mechanism 82 is then operated to separate the left half 92 and the right half 94 back to the open position 96 and the toilet lift apparatus 12 is wheeled out.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A toilet lift apparatus comprising:

a base having a left side and a right side, the left side being slidably engageable with the right side;

an attachment bar coupled to the base, the attachment bar comprising a left attachment bar and a right attachment bar, the left attachment bar being coupled to the left side of the base and the right attachment bar being coupled to the right side of the base;

a pair of supports coupled to the base, the pair of supports comprising a left support coupled to the left side of the base and a right support coupled to the right side of the base;

a cantilever coupled to the pair of supports, the cantilever comprising a left arm pivotably coupled to the left support and a right arm pivotably coupled to the right support, each of the left arm and the right arm having a lift end and a handle end, the lift end being configured to selectively engage with a toilet, the cantilever pivoting on the pair of supports to lift and alternatively lower the toilet, the cantilever having a rest position and an alternate lifted position;

a ratchet assembly coupled to the cantilever, the ratchet assembly being coupled to the handle end of each of the left arm and the right arm, the ratchet assembly pulling in, or alternatively pushing out, each of the left arm and the right arm, the ratchet assembly thus moving a left half of the toilet lift apparatus comprising the left side of the base, the left attachment bar, the left support, and the left arm of the cantilever and a right half of the toilet lift apparatus comprising the right side of the base, the right attachment bar, the right support, and the right arm of the cantilever from an open position to an alternate closed position; and a latch bar coupled to the ratchet assembly, the latch bar extending down past the attachment bar and having a plurality of hooks, each of the plurality of hooks being selectively engageable with the attachment bar to secure the cantilever in the lifted position the ratchet assembly further comprising:

a ratchet mechanism, the ratchet mechanism having a fixed half, a ratchet half, and a pair of sleeves, the fixed half being coupled to the latch bar;

a lever coupled to the ratchet mechanism, the lever having a lever arm coupled to the ratchet half and a lever pad coupled to the lever arm, the lever pad providing a place for a user to operate the ratchet mechanism; and a pair of threaded extensions coupled to the ratchet mechanism, the pair of threaded extensions being coupled within the pair of sleeves, the pair of threaded extensions rotating as the lever arm is manipulated, the pair of threaded extensions being coupled within the handle end of each of the left arm and the right arm of the cantilever.

2. The toilet lift apparatus of claim 1 further comprising a plurality of wheels coupled to the base, the plurality of wheels comprising a pair of fixed front wheels and a pair of swivelable rear wheels.

3. The toilet lift apparatus of claim 1 further comprising the base being a U-shape, each of the left side and the right side having a forward section and a rear section, the rear section being perpendicular to the forward section.

4. The toilet lift apparatus of claim 3 further comprising each of the left attachment bar and the right attachment bar having a vertical section and a horizontal section.

5. The toilet lift apparatus of claim 4 further comprising each of the pair of supports being an inverted V-shape and having a vertex, the cantilever being coupled to the vertex of each of the pair of supports.

6. The toilet lift apparatus of claim 3 further comprising a pair of pads coupled to the cantilever, the pair of pads comprising a left pad coupled to the lift end of the left arm and a right pad coupled to the lift end of the right arm.

7. The toilet lift apparatus of claim 6 further comprising a pair of handles coupled to the cantilever, the pair of handles comprising a left handle and a right handle coupled to the handle end of the left arm and the right arm, respectively.

8. The toilet lift apparatus of claim 7 further comprising each of the pair of handles being L-shaped, the pair of handles being perpendicularly coupled to the handle end of the left arm and the right arm.

9. A toilet lift apparatus comprising:

a base having a left side and a right side, the left side being slidably engageable with the right side, the base being a U-shape, each of the left side and the right side having a forward section and a rear section, the rear section being perpendicular to the forward section;

an attachment bar coupled to the base, the attachment bar comprising a left attachment bar and a right attachment bar, the left attachment bar being coupled to the left side of the base and the right attachment bar being coupled to the right side of the base;

a pair of supports coupled to the base, the pair of supports comprising a left support coupled to the left side of the base and a right support coupled to the right side of the base;

a cantilever coupled to the pair of supports, the cantilever comprising a left arm pivotably coupled to the left support and a right arm pivotably coupled to the right support, each of the left arm and the right arm having a lift end and a handle end, the lift end being configured to selectively engage with a toilet, the cantilever pivoting on the pair of supports to lift and alternatively lower the toilet, the cantilever having a rest position and an alternate lifted position;

a ratchet assembly coupled to the cantilever, the ratchet assembly being coupled to the handle end of each of the left arm and the right arm, the ratchet assembly pulling in, or alternatively pushing out, each of the left arm and the right arm, the ratchet assembly thus moving a left half of the toilet lift apparatus comprising the left side of the base, the left attachment bar, the left support, and the left arm of the cantilever and a right half of the toilet lift apparatus comprising the right side of the base, the right attachment bar, the right support, and the right arm of the cantilever from an open position to an alternate closed position; and a latch bar coupled to the ratchet assembly, the latch bar extending down past the attachment bar and having a plurality of hooks, each of the plurality of hooks being selectively engageable with the attachment bar to secure the cantilever in the lifted position;

a pair of pads coupled to the cantilever, the pair of pads comprising a left pad coupled to the lift end of the left arm and a right pad coupled to the lift end of the right arm; and each of the pair of pads being a rectangular prism having a pivot, the pivot being selectively engageable with a plurality of pivot apertures extending through the lift end of each of the left arm and the right arm of the cantilever, the pair of pads thus being pivotably coupled to the cantilever.

10. A toilet lift apparatus comprising:

a base having a left side and a right side, the left side being slidably engageable with the right side, the base being a U-shape, each of the left side and the right side having a forward section and a rear section, the rear section being perpendicular to the forward section;

a plurality of wheels coupled to the base, the plurality of wheels comprising a pair of fixed front wheels and a pair of swivelable rear wheels;

an attachment bar coupled to the base, the attachment bar comprising a left attachment bar and a right attachment bar, each of the left attachment bar and the right attachment bar having a vertical section and a horizontal section;

a pair of supports coupled to the base, the pair of supports comprising a left support coupled to the left side of the base and a right support coupled to the right side of the base, each of the pair of supports being an inverted V-shape and having a vertex;

a cantilever coupled to the pair of supports, the cantilever comprising a left arm pivotably coupled to the vertex of the left support and a right arm pivotably coupled to the vertex of the right support, each of the left arm and the right arm having a lift end and a handle end, the lift end being configured to selectively engage with a toilet, the cantilever pivoting on the pair of supports to lift and alternatively lower the toilet, the cantilever having a rest position and an alternate lifted position;

a pair of handles coupled to the cantilever, the pair of handles comprising a left handle and a right handle coupled to the handle end of the left arm and the right arm, respectively, each of the pair of handles being L-shaped, the pair of handles being perpendicularly coupled to the handle end of the left arm and the right arm;

a pair of pads coupled to the cantilever, the pair of pads comprising a left pad coupled to the lift end of the left arm and a right pad coupled to the lift end of the right arm, each of the pair of pads being a rectangular prism having a pivot, the pivot being selectively engageable with a plurality of pivot apertures extending through the lift end of each of the left arm and the right arm of the cantilever, the pair of pads thus being pivotably coupled to the cantilever;

a ratchet assembly coupled to the cantilever, the ratchet assembly comprising:
- a ratchet mechanism, the ratchet mechanism having a fixed half, a ratchet half, and a pair of sleeves;
- a lever coupled to the ratchet mechanism, the lever having a lever arm coupled to the ratchet half and a lever pad coupled to the lever arm, the lever pad providing a place for a user to operate the ratchet mechanism; and
- a pair of threaded extensions coupled to the ratchet mechanism, the pair of threaded extensions being coupled within the pair of sleeves, the pair of threaded extensions rotating as the lever arm is manipulated, the pair of threaded extensions being coupled within the handle end of each of the left arm and the right arm;

wherein the ratchet assembly pulls in, or alternatively pushes out, each of the left arm and the right arm, the ratchet assembly thus moving a left half of the toilet lift apparatus comprising the left side of the base, the left attachment bar, the left support, and the left arm of the cantilever and a right half of the toilet lift apparatus comprising the right side of the base, the right attachment bar, the right support, and the right arm of the cantilever from an open position to an alternate closed position; and a latch bar coupled to the ratchet assembly, the latch bar being coupled to the fixed half of the ratchet assembly and extending down past the attachment bar and having a plurality of hooks, each of the plurality of hooks being selectively engageable with the attachment bar to secure the cantilever in the lifted position.

* * * * *